United States Patent [19]

Carter et al.

[11] Patent Number: 5,615,175
[45] Date of Patent: Mar. 25, 1997

[54] PASSIVE DIRECTION FINDING DEVICE

[75] Inventors: G. Clifford Carter, Waterford, Conn.; J. Eric Salt; Yun X. Yuan, both of Saskatoon, Canada

[73] Assignee: The United States of America as represented by the Secretary of the Navy, Washington, D.C.

[21] Appl. No.: 530,504

[22] Filed: Sep. 19, 1995

[51] Int. Cl.$^6$ .......................................................... G01S 3/80
[52] U.S. Cl. .................................................................. 367/124
[58] Field of Search ........................................... 367/118, 122, 367/124, 129, 126; 342/147

[56] References Cited

U.S. PATENT DOCUMENTS

| | | | |
|---|---|---|---|
| 4,003,016 | 1/1977 | Remley | 367/122 |
| 4,198,705 | 4/1980 | Massa | 367/126 |
| 4,305,141 | 12/1981 | Massa | 367/105 |
| 5,070,484 | 12/1981 | Mantel | 367/124 |

*Primary Examiner*—Daniel T. Pihulic
*Attorney, Agent, or Firm*—Michael J. McGowan; James M. Kasischke; Prithvi C. Lall

[57] ABSTRACT

The present invention relates to a system and a method for determining the bearing of an object located at a distance from a reference point. A plurality of sensors are mounted to a body to detect signals emanating from the object and to convert those signals into electrical signals. The electrical signals are then processed to determine the bearing of the object from the body. The system can include a float with the body suspended from said float immersed in a fluid medium. A method for processing the electrical signals and generating the bearing information is also described.

11 Claims, 1 Drawing Sheet

PASSIVE DIRECTION FINDING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a system for providing personnel in a vehicle with information about the being of an acoustic object relative to a reference point and to a method for providing said information.

2. Prior Art

There are a large number of systems that have been developed for determining the relative positions of objects in three dimensional space. These systems utilize radio waves, electromagnetic waves, acoustic signals, and the like in different fashions to provide an operator with information about the relative positions. U.S. Pat. No. 4,734,702 to Kaplan illustrates one such system.

The Kaplan patent describes a method and apparatus for passive ranging from a moving platform to a stationary, non-cooperative emitter. The Kaplan apparatus uses a Long Baseline Interferometer to provide a very precise, but highly ambiguous, measurement of the change in phase occurring between two points along the moving platform's path and a Short Baseline Interferometer to provide a measurement of the emitter's angular position relative to the platform's path at the two points and to resolve the ambiguities in the phase change measurements of the Long Baseline Interferometer.

U.S. Pat. No. 4,797,679 to Cusdin et al. illustrates another type of system for determining the direction of incidence of electromagnetic wave signals from a distant source. The Cusdin et al. system and method measure the time of arrival of the leading edge of signals from a distant source at two relatively closed spaced receiving elements. In order to give a good degree of immunity to multipath, the times at which the instantaneous detected amplitudes of the received signals first exceed a minimal threshold value such that received signals can be satisfactorily distinguished from noise is measured in such a manner that the measured time is not affected by multipath which involves more than a few meters additional path length for the indirect, delayed signal. By making time of arrival measurements on three coplanar, non-collinear receivers, directions of incidence in three dimensions can be determined.

U.S. Pat. Nos. 4,910,526 and 5,075,694 both to Donnangelo at al. describe an airborne surveillance method and system which allows an observer aircraft to determine the position and change of position of a multiplicity of target aircraft and thus allows analysis of collision threats from these aircraft. The system uses a phase comparison direction finding antenna to determine the direction of nearby ground based SSRs and all target aircraft of interest. The system further makes use of all other available data include Mode C transponder generated altitude information of the target aircraft, the altitude of the observer aircraft, the received signal strength of both the SSR beam and the received transponder signal, the time difference of arrival between the SSR interrogation signal and the response from the target aircraft, and a variety of other factors to determine the position of the target aircraft. The system compensates for the attitude of the observer aircraft and performs optimal Kalman filtering on the input data set to produce an estimate on target position based upon prior estimates and upon information contained in the data set while making estimates of the error magnitude of each measurement and compensating for these errors. The covariance matrix Q of the Kalman filter is adaptively varied so as to optimize the estimate of the degree of correlation between various input values.

U.S. Pat. No. 5,008,679 to Effland et al relates to a method of locating an unknown radio-frequency transmitter. The method includes: (a) receipt of signals radiated from the transmitter by a plurality of receivers; (b) retransmission of the received signals to a plurality of antennas; (c) performing a time difference of arrival calculation which compensates for a relative delay value, which is a function of the distances from the transmitter to each of the receivers, the distances from each of the receivers to the antennas, and the speed of light; (d) performing a frequency difference of arrival calculation which compensates for a relative frequency value, which is a function of the relative velocity of each receiver with respect to the velocity of the Earth; (e) repeating the foregoing steps a number of times; and (f) determining the location of the unknown transmitter based on the plurality of TDOA and FDOA calculations.

U.S. Pat. No. 5,299,148 to Gardner et al. describes a process and a method for extracting or estimating directions of arrival of signals from a received data vector which has been corrupted by interfering signals and noise. The processor extracts signals by forming the scalar product of the data vector and a weight vector which is chosen such that the spectral self-coherence or conjugate spectral self-coherence of the processor output is maximized. The processor estimates the directions of arrival of signals by spectral self-coherence-selective performance surfaces for maxima.

U.S. Pat. No. 5,302,957 to Franzen describes a passive distance measuring system. The passive system operates by measuring the time interval between arrival of a precision sweep scanned signal such as a radio frequency signal at two widely dispersed different signal receptor locations on the aircraft. By knowing the angular sweep velocity of the received signals and the receptor or antenna separation distance on the aircraft, the distance of the aircraft from the scanning source of radio frequency signals may be computed with appreciable precision. The Franzen disclosure includes analog-to-digital signal conversion and modifications of the invention including optical or laser signals in lieu of the preferred microwave radio frequency signals.

U.S. Pat. No. 5,099,456 to Wells describes a passive surveillance system which provides ranging and location capability of a signal source. A single acoustic receiver in a multipath environment or, alternatively, a plurality of acoustic receivers receive the signal from the source having different propagation delays along different paths. Selection of corresponding frequency components from different paths and mixing of the correspond selected frequency components from each of the paths generates complex pseudo-noise signals that are suitable for correlation processing. Correlation processing of the mixed signals yields the time difference between the multiple paths. The maximum time difference parameters for each path are used to generate a locus line, either implicitly or explicitly. Range and location processing of the locus information identifies range and location of the signal source.

U.S. Pat. No. 5,317,323 to Kennedy et al. relates to a system for accurately locating a mobile cellular radio. The system includes plural radio receivers whose position is known, a satellite-based time source for providing the actual time of arrival of a radio signal at the plural radio receivers, and a device for removing multipath and co-channel interference from the received signals so that actual time of arrival of the radio signal may be determined accurately. The Global Positioning System may be used to provide the time signal and to provide the precise location of the plural radio receivers. The system may be used to passively determine the location of the mobile radio and may be used with a computer generated map system.

Classes of passive acoustic localization systems include those which utilize relative long towed arrays or streamers and those which utilize detached arrays or sonobuoys. The detached systems are usually deployed from low flying aircraft. The acoustic signals detected by the sensors are then transmitted to a separate computer via an RF transmitter in the sonobuoy.

To localize an acoustic source in three dimensions using sonobuoy technology requires at least two sonobuoys, each supporting a submerged sensor or vertical array. One vertical array, by itself, can only provide range and depth information. When this information is coupled with the information from a second vertical array, the source can be localized to two possible positions. To completely localize a source, a third vertical array is required.

SUMMARY OF THE INVENTION

Accordingly, it is an object of the present invention to provide a system for determining the direction or azimuthal angle of a signal emitting object from a reference point.

It is a further object of the present invention to provide a system as above which uses signal energy information to provide an estimated bearing of a signal emitting object.

It is still a further object of the present invention to provide a system as above which makes complete three dimensional localization of an object possible from a plurality of sensors positioned at a single location.

It is yet a further object of the present invention to provide a method for detecting the source bearing of a signal emitting source and for determining the location of the source.

The foregoing objects are attained by the system and method of the present invention.

In accordance with the present invention, a system for determining the direction or azimuthal angle of a signal emitting object relative to a reference point is provided. The system of the present invention utilizes signal energy information, instead of time delay information, to determine the bearing of the object relative to the reference point.

In one embodiment, the system of the present invention includes a float, such as an air float, and a plurality of acoustic sensors suspended beneath the float for receiving acoustic signals emanating from an object and for converting the acoustic signals into electrical signals. The plurality of sensors may be one or more arrays of acoustic sensors mounted to a body, such as a single sonobuoy, immersed in the fluid medium. A computer programmed to process the signals received by the acoustic sensors may be located within a remote craft or within the body on which the sensors are mounted. The preprogrammed computer processes the signals to determine a bearing estimate for the object.

The method for determining the location of the object radiating the signal broadly comprises the steps of: deploying at least one array of acoustic sensors in a horizontal plane so that said sensors are spaced around a center point in said plane for receiving signals emanating from the object; measuring the power of the signals received from each of the sensors; selecting the two adjacent ones of the sensors with the largest signal powers; and determining a bearing estimate of the object from the signals received by the two adjacent ones of the sensors.

Other details, objects and advantages of the system and method of the present invention are set forth in the following detailed description and the accompanying drawings in which like reference numerals depict like elements.

DESCRIPTION OF THE PREFERRED EMBODIMENT(S)

Figure 1:
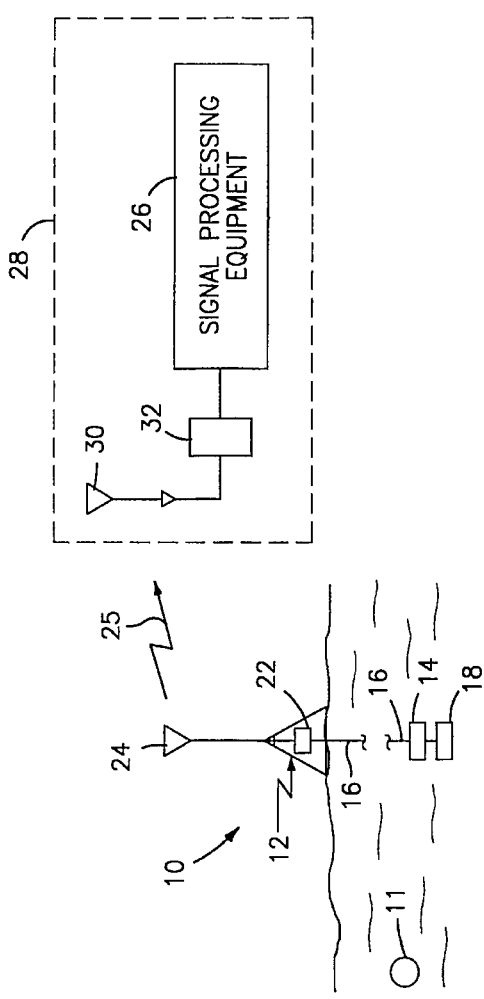
FIG. 1 is a schematic representation of the system of the present invention.

Referring now to the drawings, FIG. 1 illustrates a system 10, in accordance with the present invention, for determining the direction or azimuthal angle of an object 11 from which acoustic signals are emanated. The system 10 comprises a float 12 and a body 14, such as a sonobuoy, suspended beneath the float 12 by cable 16. An electronic compass 18 is either supported within or supported beneath the body 14. The electronic compass 18 provides a signal which is indicative of the position of the body 14 which serves as a reference point.

Figure 2:
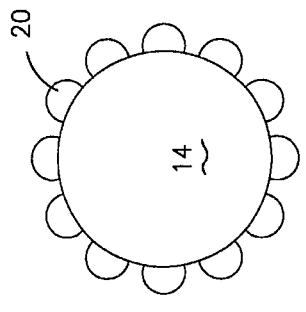
FIG. 2 is a top view of a body used in the system of the present invention to which an array of acoustic sensors is attached.

Referring now to FIG. 2, acoustic sensors 20 are mounted to the periphery of the body 14. The sensors 20 may comprise any suitable directional acoustic-electric sensor known in the art for receiving an acoustic signal and converting the acoustic signal to an electrical signal. For these sensors, the acoustic-electric conversion gain varies with the direction of arrival of the acoustic source signal and not on the vertical angle of arrival. The gain profiles of the sensors are preferably chosen to overlap each other so that at least two sensors can receive significant levels of the signals emanating from the object 11 over an observation time interval. Each sensor 20 preferably has a high center gain.

The sensors 20 are mounted to the body 14 so that they look outwardly and accept very little signal arriving from the back half space. Additionally, the sensors 20 are mounted in a single plane, and, as shown in FIG. 2, are uniformly spaced around the 360° periphery of the body 14 and about a center point in said plane. In a preferred embodiment, the sensors 20 receive a signal from one direction in said plane. While the array of sensors may contain any desired number of sensors 20, it must have at least three.

Figure 3:
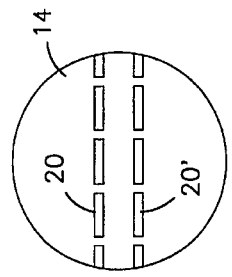
FIG. 3 is a side view of a body used in the system of the present invention having two vertically spaced arrays of acoustic sensors mounted thereto.

FIG. 3 illustrates an alternative sensor configuration. As shown in this figure, two arrays of sensors 20 and 20' are mounted to the body 14 with the arrays being vertically displaced from each other. Each array of sensors 20 and 20' is positioned within a single plane. Additionally, the sensors in each array are spaced uniformly about the periphery of the body 14. Preferably, the sensors in each array are vertically aligned with each other.

Referring back to FIG. 1, the float 12 is provided with an RF transmitter 22 and an antenna 24 for using radio waves 25 to transmit the acoustic signals received by the sensors 20 to signal processing equipment 26 located aboard a remote vehicle or craft 28. As shown in FIG. 1, the vehicle or craft 28 is provided with a receiving antenna 30 and a device 32 for converting the RF signal to a baseband signal. The device 32 can comprise any suitable conversion device known in the art. Its structure does not form part of the present invention. The signal processing equipment 26 can comprise any suitable computer known in the art. The computer can be preprogrammed in any desired computer language to carry out the functions to be described in connection with FIG. 4.

While the signal processing equipment has been shown as being in the craft 28, it could be located in the body 14 if desired. In such an event, the need for an RF link is eliminated.

Similarly, while the system 10 has been described as including a float, it should be recognized that the body 14 with the sensors 20 and the compass 18 could be supported from a stationary craft.

Figure 4:
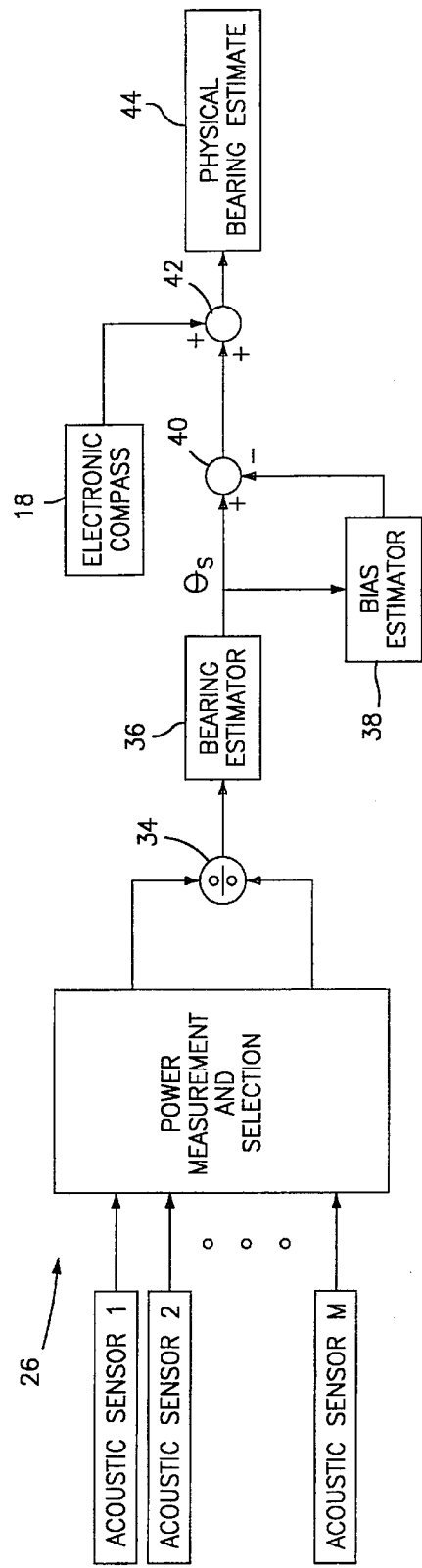
FIG. 4 is a flow chart illustrating the processing of the signals received by the acoustic sensors.

FIG. 4 illustrates the manner in which the signal processing equipment 26 processes the acoustic signals received by the sensors 20 or 20' and converted into bearing estimate signals. The signals from each of the sensors 20 or 20' is provided to the signal processing equipment 26 where the power of each signal is measured over a desired time interval to obtain an average power signal for each sensor. The time interval can be a time interval chosen by the system operator or a preset interval. It is preferred that the time interval be short in duration. The signal processing equipment 26 is configured so as to select the two adjacent sensors with the largest average signal powers. The signals from these two sensors are then used to estimate the bearing of the object 11 relative to the body 14. Where the system has two vertically spaced arrays of sensors as shown in FIG. 3, the signal processing equipment 26 selects the two adjacent sensors with the largest average signal power from only one of the arrays.

Once the two average signal powers have been selected, the signals are passed through a dividing circuit 34 to form a signal representative of the ratio of the two signals. This ratio signal is then passed through a bearing estimator 36 where an estimate of the bearing to the object 11 is derived. This estimate may be derived using one of the following two equations:

$$\theta_s = \frac{\mu_k + \mu_{k+1}}{2} - \frac{\sigma^2}{2(\mu_{k+1} - \mu_k)} \ln(\hat{r}_1) \quad (1)$$

where $\theta_s$ = estimate bearing;

$\mu_k$ = look angle of sensor k;

$\mu_{k+1}$ = look angle of sensor k+1;

$\sigma$ = gain profile spread factor for Gaussian-shaped gain profiles; and $\hat{r}_1$ = estimated ratio of the average signal powers from the two sensors or $$\theta_s = \frac{\mu_k + \mu_{k+1}}{2} - \frac{\sigma^2}{2(\mu_{k+1} - \mu_k)} \ln\left(\frac{1-r_2}{1+r_2}\right) \quad (2)$$

where $\theta_s$, $\mu_k + \mu_{k+1}$, $\mu_{k+1} - \mu_k$ and $\sigma$ are as above and $r_2$ = ratio of the average signal powers. The bearing estimate $\theta_s$ generated by the bearing estimator 36 is then transmitted to a bias estimator 38 which generates a correction signal. The function of the bias estimator is to remove any bias in the estimate. The bias of the bias estimator can be expressed in accordance with the following equation:

$$E\{\hat{r}_1 - r_1\} \approx \frac{(r_1 - 1)}{g^4(\theta_s^{k+1})\mu_s^2} E\{\epsilon_k \epsilon_{k+1}\} + \quad (3)$$

$$\frac{1}{g^2(\theta_s^{k+1})\mu_s} (E\{\epsilon_k\} - r_1 E\{\epsilon_{k+1}\})$$

where $E\{\hat{r}_1 - r_1\}$ = bias of the ratio estimator $\hat{r}_1$ = estimated ratio of the average signal powers $r_1$ = ratio of the average signal powers g = voltage gain $\theta_s^{k+1}$ = source arrival angle for sensor k+1

$\mu_s$ = mean value of the source signal power $\epsilon_k$ = noise component of power delivered by sensor k $\epsilon_{k+1}$ = noise component of power delivered by sensor k+1

$E\{\cdot\}$ = expected value.

The bias of the bias estimator for equation (2) can be expressed in accordance with the following equation:

$$E\{\hat{r}_2 - r_2\} \approx \frac{1}{(g^2(\theta_s^k) + g^2(\theta_s^{k+1}))^2 \mu_s^2} E\{\bar{\epsilon}_k \epsilon_k^+\} + \quad (4)$$

$$\frac{1}{(g^2(\theta_s^k) + g^2(\theta_s^{k+1}))\mu_s} (E\{\bar{\epsilon}_k\} - r_2 E\{\epsilon_k^+\})$$

where $E\{\hat{r}_2 - r_2\}$ = bias of the ratio estimator;

$g(\theta_s^k)$ = voltage gain at sensor k;

$g(\theta_s^{k+1})$ = voltage gain at sensor k+1;

$\mu_s$ = mean value of the source signal power;

$E\{\cdot\}$ = expected value;

$\bar{\epsilon}_k$ = difference of noise components of average signal powers delivered by two adjacent sensors;

$\epsilon_k^+$ = sum of noise components of average signal powers delivered by two adjacent sensors $\hat{r}_2$ = estimated ratio of the average signal powers delivered by two adjacent sensors; and $r_2$ = ratio of the average signal powers delivered by two adjacent sensors.

The correction signal generated by the bias estimator 38 is fed to first summer 40 where it is combined with the bearing estimate signal $\theta_s$ to form an unbiased bearing estimate signal. The unbiased bearing estimate signal is then fed to second summer 42 where it is combined with a signal from the electronic compass 18. The resulting signal 44 is representative of the physical bearing from the body 14 to the object 11.

Having determined the bearing from the body 14 to the object 11, it is possible to determine the range and depth of the object 11. This is done by measuring the time differences in arrival times of the acoustic signal(s) emanating from the object 11 at the two vertically separated arrays of sensors 20 and 20'. The manner in which the range and depth are determined does not form part of the present invention. It is described in detail in the thesis "Passive Localization of An Underwater Acoustic Source Using Directional Sensors" by inventor Yun Xiang Yuan of October 1994, which thesis is incorporated by reference herein. Obviously, a depth bearing can be determined using a plurality of sensors located in a vertical plane in accordance with the present invention.

The system and the method of the present invention have several advantages. The first is that they produce a bearing estimate with a single sonobuoy versus currently used systems which require two or three sonobuoys. The invention also takes advantage of the total available signal bandwidth including those parts with high powered tonals while conventional sonobuoy systems cannot utilize high powered tonal information. Conventional systems are based on time delay estimates which become ambiguous in the presence of high powered tonals. Still further, the system of the present invention has the advantage that it can be used in air or water.

It is apparent that there has been provided in accordance with this invention a compact acoustic direction finding device which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Although an acoustic device is specified, this device can be applied to find a bearing to any radiation emitting object. For example, an installation can be equipped with numerous directional radio antennas to determine the bearing to a radio wave emitting object. Accordingly, it is intended to embrace all such alternatives, modifications, and variations as fall within the spirit and broad scope of the appended claims.

What is claimed is:

1. A direction finding device for finding a bearing to a source radiating a signal, said device comprising:

a first array of sensors disposed in a horizontal plane, each sensor in said array having a high center gain, and said sensors being spaced around a center point in said plane to receive said signal from one direction in said plane;

signal processing electronics joined to said array of sensors and accepting said received signals, said signal processing electronics measuring the average power of the signal received by each said sensor during a predetermined time interval and selecting two adjacent ones of said sensors having the greatest average power; and a bearing estimator joined to said signal processing electronics, said bearing estimator calculating the bearing from said sensor array to said source using signals from said two adjacent ones of said sensors having the greatest average power and providing an estimated bearing signal responsive to said calculated bearing.

2. The device of claim 1 wherein said array of sensors are hydrophones disposed in a liquid medium and said signal is an acoustic signal.

3. A direction finding device for finding a bearing to a source radiating a signal, said device comprising:

a first array of sensors disposed in a horizontal plane, each sensor in said array having a high center gain, and said sensors being spaced around a center point in said plane to receive said signal from one direction in said plane;

signal processing electronics joined to said array of sensors and accepting said received signals, measuring the average power of the signal received by each said sensor during a predetermined time, and selecting two adjacent ones of said sensors having the greatest average power;

a bearing estimator joined to said signal processing electronics, said bearing estimator calculating the bearing from said sensor array to said source using signals from said signal processing electronics and providing an estimated bearing signal responsive to said calculated bearing;

a bias eliminating device joined to said bearing estimator to calculate the bias for said estimated bearing signal; and a first summer to combine said calculated bias with said estimated bearing signal to produce an unbiased bearing signal.

4. The device of claim 3 further comprising:

a compass providing an orientation signal; and a second summer correlating said unbiased bearing signal with said orientation signal to provide a physical bearing signal.

5. The device of claim 3 further comprising:

a second array of sensors disposed in a horizontal plane parallel to said array of sensors, each sensor in said array having a high center gain, and said sensors being spaced around a center point in said plane to receive signals from one direction in said plane;

time delay estimation circuitry joined to said first and second arrays of sensors to calculate depth and range to said object using the time delay between receipt of said signal at said first array and receipt of said signal at said second array.

6. A method for determining the bearing to an object radiating a signal, said method comprising the steps of:

deploying at least one array of sensors in a horizontal plane so that said sensors are spaced around a center point in said plane;

receiving signals from said object at said at least one array;

measuring the power of said signals received from each of said sensors over a predetermined time interval;

determining an average power signal for each of said sensors;

selecting the two adjacent ones of said sensors with the largest average signal powers; and determining a bearing estimate of said object from said signals received by said two adjacent ones of said sensors.

7. The method of claim 6 wherein said bearing estimate determining step comprises:

forming a signal representative of the ratio of said signals from said two selected sensors; and generating a signal representative of an estimate of said bearing from said ratio.

8. The method of claim 6 further comprising:

said deploying step comprising deploying a second array of sensors in a horizontal plane so that said sensors are spaced around a center point in said plane and vertically spaced from said at least one array of sensors; and receiving signals from said object at said second array of sensors;

measuring the time delay between receipt of said signals at said at least one array and said second array; and determining depth and range to said object using said measured time delay.

9. The method of claim 6 wherein said deploying step comprises deploying an array of hydrophones in a liquid medium for detecting an acoustic signal.

10. A method for determining the bearing to an object radiating a signal, said method comprising the steps of:

deploying at least one array of sensors in a horizontal plane so that said sensors are spaced around a center point in said plane;

receiving signals from said object of said at least one array;

measuring the power of said signals received from each of said sensors;

selecting the two adjacent ones of said sensors with the largest signal powers;

determining a bearing estimate of said object from said signals received by said two adjacent ones of said sensors, said bearing estimate determining step comprising forming a signal representative of the ratio of said signals from said two selected sensors and generating a signal representative of an estimate of said bearing from said ratio; and said bearing estimate determining step further comprising eliminating bias from said generating bearing estimate signal to form a signal representative of an unbiased bearing estimate.

11. The method of claim 10 wherein said bearing estimate determining step further comprises combining said unbiased bearing estimate signal with a signal from an electronic compass to form a signal representative of said bearing from said reference point to said object.

* * * * *